United States Patent [19]

Finke et al.

[11] Patent Number: 4,980,451

[45] Date of Patent: Dec. 25, 1990

[54] CATALYTIC PRODUCTION OF AROMATIC POLYAMIDES FROM HIGH PURITY MONOMERS

[75] Inventors: Jürgen Finke, Marl; Martin Bartmann, Recklinghausen; Roland Feinauer, Marl, all of Fed. Rep. of Germany

[73] Assignee: Huels Aktiengesellschaft, Marl, Fed. Rep. of Germany

[21] Appl. No.: 472,918

[22] Filed: Jan. 31, 1990

[30] Foreign Application Priority Data

Feb. 25, 1989 [DE] Fed. Rep. of Germany ....... 3905885

[51] Int. Cl.$^5$ .............................................. C08G 69/28

[52] U.S. Cl. ................................... 528/336; 524/414; 524/606; 528/126; 528/179; 528/183; 528/337; 528/348

[58] Field of Search ............... 528/336, 126, 179, 183, 528/337, 348; 524/414, 606

[56] References Cited

U.S. PATENT DOCUMENTS

| | | | |
|---|---|---|---|
| 3,932,364 | 1/1976 | Yamazaki et al. | 528/336 |
| 4,720,538 | 1/1988 | Bartmann | 528/336 |
| 4,749,768 | 6/1988 | Finke et al. | 528/336 |

*Primary Examiner*—Harold D. Anderson
*Attorney, Agent, or Firm*—Millen, White & Zelano

[57] ABSTRACT

Aromatic polyamides having an improved resistance against thermal oxidation, are produced by utilizing monomers having a very high degree of purity, at least 99.90% by weight, preferably, at least 99.94%.

7 Claims, No Drawings

CATALYTIC PRODUCTION OF AROMATIC POLYAMIDES FROM HIGH PURITY MONOMERS

CROSS REFERENCE TO RELATED APPLICATIONS

This application is related to copending, coassigned application entitled Production of Thermoplastically Processable, Aromatic Polyamide Using a 4-Phenoxypyridine Stabilizer and copending, coassigned application entitled Production of Aromatic Polyamides with Fused Ring Stabilizer.

BACKGROUND OF THE INVENTION

The invention relates to a process for the production of thermoplastically processable, aromatic polyamides, resultant compositions and articles of manufacture made therefrom.

Conventional polyamides are produced by the polycondensation of the starting monomers set forth below:

(A) HOOC—Ar—COOH (B) $H_2N$—Ar'—$NH_2$ with the following meanings:

Ar: 1,3- or 1,4-phenylene; 1,4-, 1,5-, 2,6- or 2,7 naphthylene,

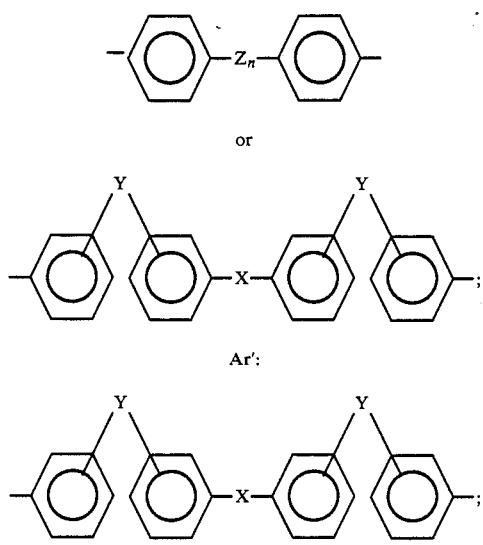

or

Ar':

X: —$SO_2$—; —CO—;
Y: —O—; —S—;
Z: —O—; —S—; —$SO_2$—; —CO—; —$CR_2$—;
R: —H; $C_1$-$C_4$-alkyl;
n: 0; 1;

in the melt in the presence of 0.05-4 mol %, based on the sum total of components (A) and (B), of a phosphorus-derived acid of the general formula $H_3PO_n$ wherein n=2 to 4, or triphenyl phosphite, at temperatures in the range of 200° to 400° C.

The production of such polyamides is basically known (DOS 3,609,011). Because the melt viscosity of these aromatic polyamides is high, even higher temperatures are required during their manufacture and processing, generally at least 350° C. At these temperatures, damage to the product is frequently observed, recognizable by discolorations or an impairment of the mechanical properties.

SUMMARY OF THE INVENTION

An object of the invention is to provide molding compositions based on aromatic polyamides which do not exhibit the aforedescribed disadvantages of the prior art products.

Another object is to provide a process for producing the polyamides for such compositions.

Still another object is to provide articles of manufacture produced from such molding compositions.

Upon further study of the specification and appended claims, further objects and advantages of this invention will become apparent to those skilled in the art.

These objects are attained by providing that the monomers employed exhibit a degree of purity of at least 99.90% by weight.

Preferred are dicarboxylic acids (component A) having a degree of purity in the range from 99.94 to 99.999% by weight, and diamines (component B) having a degree of purity in the range from 99.94 to 99.999% by weight.

For the production of the aromatic polyamides, suitable aromatic dicarboxylic acids (component A) include but are not limited to isophthalic acid, terephthalic acid, 1,4-, 1,5-, 2,6-, 2,7-naphthalenedicarboxylic acid, 4,4'-diphenyl ether dicarboxylic acid or 4,4'-benzophenonedicarboxylic acid, 4,4'-diphenylsulfonedicarboxylic acid, 2-phenoxyterephthalic acid or mixtures thereof.

The preferred component (A) is isophthalic acid by itself or a mixture of isophthalic acid with one of the other above-mentioned acids. In the latter case, up to 45 mol % of isophthalic acid is replaced.

Suitable aromatic diamines component (B) include but are not limited to, for example, 4,4'-bis(4-aminophenoxy)diphenylsulfone, 4,4'-bis(3-aminophenoxy)diphenylsulfone, 4,4'-bis(4-aminophenoxy)benzophenone, 4,4'-bis(3-aminophenoxy)benzophenone, 4,4'-bis(p-aminophenylmercapto)diphenylsulfone or mixtures thereof.

4,4'-Bis(4-aminophenoxy)diphenylsulfone (component B) is the preferred amine.

The molar ratio in which components (A) and (B) are used ranges at about 1:1.

Prior to the present invention, it was conventional to use purities of component (B) of not more than 99.8 % by weight. To achieve the increased purities of the monomers of this invention, the monomers were recrystallized several times as described in U.S. Pat. No. 3,895,064.

The glass transition temperatures ($T_g$) of the polyamides according to this invention are in the range of about 190°-270° C. and the viscosity numbers (J values) are about 30-100 cc/g, preferably 60-80 cc/g. (J values are also known as intrinsic viscosities, limiting viscosity numbers, and the Staudinger index, Rompper 8th edition, Vol. 6, p. 4532).

As indicated above, the production of the aromatic polyamides is basically conventional and described, inter alia, in DOS 3,609,011, i.e., by the polycondensation of components (A) and (B) in the presence of a phosphorus-derived acid of the general formula $H_3PO_n$ wherein n=2 to 4 inclusive, or triphenyl phosphite.

Suitable acids derived from phosphorus are hypophosphorous acid, phosphorous acid, phosphoric acid.

The catalyst is utilized in amounts of 0.1–0.9 mol %—based on the sum total mols of components A and B.

A preferred mode of operation when producing the aromatic polyamides is to utilize, besides the phosphorus-containing catalyst, also dialkylaminopyridines as a cocatalyst.

Especially suitable dialkylaminopyridines are those of 1-10 carbon atoms in the alkyl group. Preferred are 4-dimethylaminopyridine, 4-dibutylaminopyridine, 4-piperidinylpyridine, which can optionally form a pyrrolidine or piperidine ring together with the amino nitrogen.

If a cocatalyst is employed, it is used in an amount of 0.01—2 mol %, preferably 0.1—0.9 mol %—based on the sum total of components A and B. In especially preferred instances, the cocatalyst is added into the reaction mixture in an equivalent quantity with respect to the phosphorus-containing catalyst.

The reaction is performed in the melt at temperatures ranging from about 200° to 400° C., preferably 230°-360° C., and conventionally carried out under an inert gas and under normal pressure. However, superatmospheric pressure or a vacuum can likewise be used.

In order to increase molecular weight, the aromatic polyamides can be subjected to solid-phase recondensation in an inert gas atmosphere.

The polyamides can be processed by means of conventional machines into molding compositions which can also additionally contain fillers, such as talc, or reinforcing media, such as glass fibers, aramid fibers, or carbon fibers, as well as other usual additives, such as, for example, pigments and/or stabilizers.

The molding compositions are processed into molded parts, fibers, films, etc., in accordance with conventional methods, such as injection molding, extrusion, or similar processes. Use as a coating agent is likewise possible, starting with powder (e.g., fluidized bed coating method), a liquid dispersion, or a solution.

Aromatic polyamides produced in accordance with the process of this invention exhibit an unexpectedly high temperature stability. Processing of the products can take place even at temperatures of above 340° C. without the occurrence of a drop in molecular weight or brown discoloration. Furthermore, molding compositions obtained according to the invention show excellent stability with respect to thermal oxidation so that they can be utilized even at markedly higher temperatures than corresponding prior art compositions. Added to these properties is a good heat deflection temperature, i.e., molding compositions based on the aromatic polyamides of this invention, can be exposed to high temperatures over long periods of time without incurring a marked loss of mechanical properties.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application P 39 05 885.9, are hereby incorporated by reference.

The glass transition point ($T_g$) referred to in this specification was determined with the use of a differential scanning calorimeter (DSC) at a heating rate of 10° C./min.

The viscosity numbers (J) referred to in this specification were determined by using 0.5% by weight solutions of the polymers in a phenol/o-dichlorobenzene mixture (1:1 part by weight) at 25° C. in accordance with DIN 53 728.

Thermal aging of the test specimens was performed in a recirculating-air oven with a 10% fresh air feed.

Measurement of the ultimate strength was conducted according to DIN 53 455/3.

The purity of the diamine was determined by thin-layer chromatography on silica gel with chloroform; quantitative evaluation was performed by UV spectroscopy.

Determination of the purity of the dicarboxylic acids was done by gas chromatography.

Examples identified by letters are not in accordance with this invention.

EXAMPLES

General Method for the Manufacture of the Aromatic Polyamides

| 43.25 kg (100 mol) | 4,4'-bis(4-aminophenoxy)diphenylsulfone (*) |
|---|---|
| 16.61 kg (100 mol) | isophthalic acid (99.99% chemical purity) |
| 33 g (0.25 mol) | 50% aqueous hypophosphorous acid |
| 30.5 g (0.25 mol) | 4-dimethylaminopyridine |

(I) The degree of purity of the diamine can be derived from the table.

The starting materials were heated in a polycondensation reactor equipped with nitrogen inlet, agitator and distillation unit in a nitrogen stream of 20 l/h to 300° C. The melt was stirred for 2 hours; the water released during the reaction was removed from the distillation unit by an expansion valve. The viscous product was discharged from the polycondensation reactor and recondensed in an extruder with the application of a vacuum.

Thermal aging in the air was conducted over 1000 hours at 200° C.

The following table demonstrates the dramatic effect of the degree of purity on the ultimate strength tested after the thermal aging treatment as a percent of the ultimate strength before the thermal aging test.

TABLE

| Example No. | Degree of Purity [% by Wt] | Ultimate Strength [%] |
|---|---|---|
| 1 | ≧99.99 | 100 |
| 2 | 99.94 | 92 |
| 3 | 99.91 | 84 |
| 4 | 99.90 | 82 |
| A | 99.89 | 68 |
| B | 99.87 | 62 |

The very high purities of the diamine were obtained by recrystallisation from water/dioxane/ethanol (1:1:1 by volume).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing a thermoplastically processable, aromatic polyamide by polycondensation of the following starting monomers:

(A) HOOC—Ar—COOH (B) $H_2N$—Ar'—$NH_2$ wherein

Ar is 1,3- or 1,4-phenylene, 1,4-, 1,5-, 2,6- or 2,7-naphthylene,

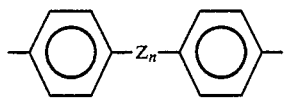

Ar' is:

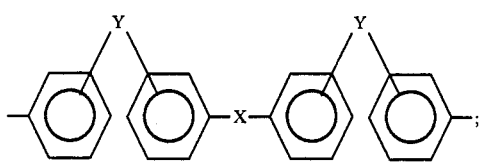

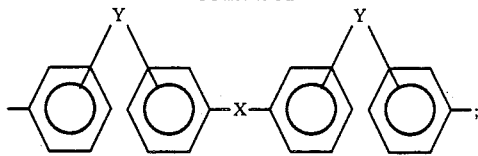

X is —$SO_2$— or —CO—;
Y is —O— or —S—;
Z is —O—; —S—; —$SO_2$—; —CO— or —$CR_2$—;
R is —H or $C_1$–$C_4$-alkyl;
n is 0; 1;

in the melt in the presence of 0.05–4 mol %, based on the total mols of components (A) and (B), of an acid of the formula $H_3PO_n$ wherein n is 2 to 4 inclusive, or triphenyl phosphite, at a temperature of about 200°–400° C., the improvement comprising poly condensing monomers having a degree of purity of at least 99.90% by weight.

2. A process according to claim 1, wherein component (A) has a degree of purity of 99.94–99.999% by weight.

3. A process according to claim 1, wherein the component (B) has a degree of purity of 99.94–99.999% by weight.

4. A process according to claim 2, wherein the component (B) has a degree of purity of 99.94–99.999% by weight.

5. A composition produced by the process of claim 1.

6. A composition produced by the process of claim 4.

7. An article of manufacture made by molding a molding composition comprising the composition according to claim 5.

* * * * *